(12) United States Patent
Schuermann et al.

(10) Patent No.: US 6,393,048 B1
(45) Date of Patent: May 21, 2002

(54) METHOD FOR THE TRANSFERRING A DIGITAL DATA SIGNAL USING SPREAD SPECTRUM

(75) Inventors: Josef H. Schuermann, Oberhummel; Jurgen Anton Mayer, Kissing, both of (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/168,839

(22) Filed: Oct. 8, 1998

(30) Foreign Application Priority Data

Oct. 10, 1997 (DE) ............................................ 197 44 915

(51) Int. Cl.[7] .............................................. H04B 1/707
(52) U.S. Cl. ....................................... 375/140; 375/141
(58) Field of Search .................................. 375/140, 141, 375/142, 145, 146, 147, 149, 150, 367; 370/320, 335, 342, 441

(56) References Cited

U.S. PATENT DOCUMENTS

| 4,164,628 A | * | 8/1979 | Ward et al. ................... 375/150 |
| 5,093,841 A | * | 3/1992 | Vancraenest ................. 375/149 |
| 5,335,249 A | * | 8/1994 | Krueger et al. ............. 375/149 |
| 5,754,603 A | * | 5/1998 | Thomas et al. ............. 375/367 |
| 6,005,883 A | * | 12/1999 | Trompower ................. 375/141 |
| 6,097,714 A | * | 8/2000 | Nagatani et al. ............ 370/342 |

\* cited by examiner

*Primary Examiner*—Betsy L. Deepe
(74) *Attorney, Agent, or Firm*—Wade James Brady, III; Frederick J. Telecky, Jr.

(57) ABSTRACT

In the method for the transfer of a digital data signal with predetermined band width from a transmitter to a receiver, the spread spectrum technique is used. In the method, the data signal is modulo-2 added with a PN code sequence, the bit rate of which is very much higher than the bit rate of the data signal. A carrier is then modulated with the resulting spread signal, after which the carrier is transmitted. The modulated carrier is demodulated in a receiver and the demodulated signal, to obtain the data signal, is multiplied with the PN code sequence produced in the receiver, synchronized with the PN code sequence of the transmitter by autocorrelation. A periodic rectangular signal with a constant duty cycle is used as code sequence.

3 Claims, 1 Drawing Sheet

METHOD FOR THE TRANSFERRING A DIGITAL DATA SIGNAL USING SPREAD SPECTRUM

BACKGROUND AND BRIEF DESCRIPTION OF THE PRIOR ART

The invention relates to a method for the transfer of a digital data signal with predetermined bandwidth from a transmitter to a receiver using the spread spectrum technique, in which the data signal is modulo-2 added with a PN code sequence, the bit rate of which is very much higher than the bit rate of the data signal, then a carrier is modulated with the thereby resulting spread data signal, the modulated carrier is transmitted, in the receiver the modulated carrier is demodulated and the demodulated signal, to obtain the digital data signal, is multiplied with a PN code sequence produced in the receiver, synchronized with the PN code sequence of the transmitter through autocorrelation.

Data transfer methods which operate using the spread spectrum technique are used especially when a high suppression of spurious signals is to be achieved under unfavorable transfer conditions. The principles of the spread spectrum technique are described for example in the "Taschenbuch der Hochfrequenztechnik", 5th edition 1992, publ. Springer-Verlag, Chapter 0 46 ff. It is also indicated there that this technique was used hitherto in particular in the field of air and space travel for the transfer of information under particularly difficult conditions. Also in fields in which a particular protection against interception is involved, for example in radar technolgy and navigation, this spread spectrum technique was frequently used. A type of spread spectrum technique is the so-called direct sequence method (DS method), in which the signal which is to be transferred, which is present in digital form, is modulated with a PN code sequence (in which PN stands for "pseudo Noise"), which is provided so that a spreading of the signal which is to be transferred is achieved.

Here, the possibility exists of modulating the data signal to be transferred before spreading onto a carrier and then spreading the modulated carrier or else only spreading the data signal to be transferred and then modulating the spread signal onto the carrier. On the receiver side, the data signal is recovered by the spread signal being unspread again by mixing in the PN code sequence. This unspreading process is carried out using an autocorrelation stage. The PN code sequences used in the spread spectrum transfer methods hitherto have a very great length and are generally produced with binary shift registers. For this, a relatively great circuitry expenditure is necessary, so that the spread spectrum technique has not been used hitherto in data transfer systems which are to be realized expending as little cost as possible.

Increasingly more data transfer systems are required which are insensitive to interference, which are to be produced in large numbers and at low costs. Examples of this are systems by which the data picked up from water meters, gas meters, electricity meters or calorimeters on radiators can be transferred via radio to reading apparatus or to central storage apparatus, so that the expenditure for drawing up calculations of consumption can be reduced. The electronic systems used in the said counters are battery-operated, so that in addition to the low costs also a low energy consumption represents one of the preconditions for their general applicability. The requirement of the low energy consumption only permits short data telegrams, care having to be taken, however, that nevertheless a problem-free evaluation, not adulterated by interference, is made possible of the transferred information.

SUMMARY OF THE INVENTION

The invention is therefore based on the problem of providing a method of the type initially mentioned, by means of which favorably-priced apparatus can be constructed, which nevertheless permit a transfer of data which is insensitive to interference.

According to the invention, this problem is solved in that with the method initially mentioned, a periodic rectangular signal with a constant duty cycle is used as the PN code sequence.

The method according to the invention makes possible the production of the PN code sequence by means of a simple rectangular generator, i.e. without a great switching expenditure. In addition, the use of this particular PN code sequence makes possible a very quick synchronizing of the generator which on the receiver side produces the PN code sequence which is required for the unspreading of the data signal. This very short synchronizing time permits a considerable shortening of the overall length of the transmitted data telegram, so that the target which is aimed for, namely of energy-saving data transfer insensitive to interference, is achieved.

Advantageously, the duty cycle of the PN code sequence is set at 1:4, which produces a favorable energy distribution in the spectrum of the spread signal and makes possible a quick synchronizing in the autocorrelation stage of the receiver.

An embodiment of the invention is now explained by way of example with the aid of the drawing, in which:

DESCRIPTION OF THE PREFERRED EMBODIMENT

In the following description of the method according to the invention, it is assumed that the transmitter is accommodated in a calorimeter which is secured to a radiator and can pick up and store intermediately the amount of heat emitted from the radiator. The intermediately stored measurement result can be transmitted for example as a reaction to a call signal and can be picked up be a reading apparatus. The way in which the transmission process is triggered is not important for the method to be described here, so it is not entered into in further detail here.

Figure 1:
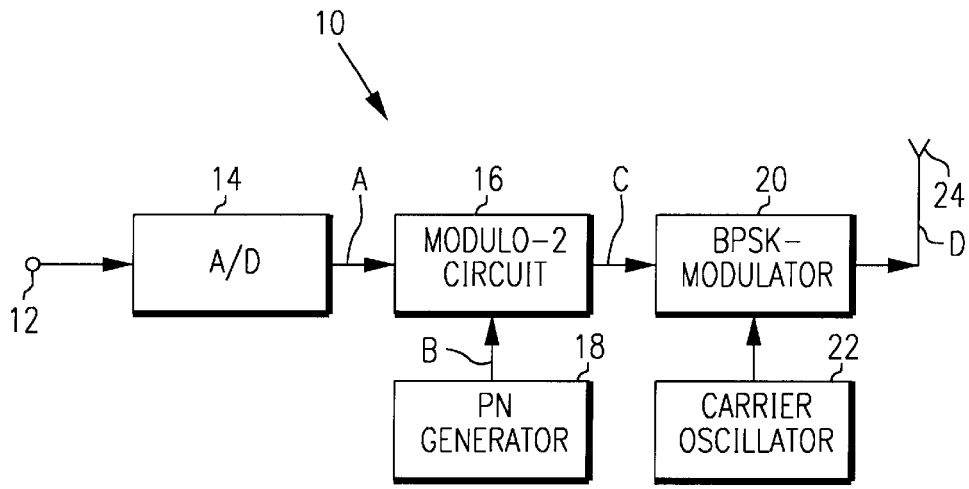
FIG. 1 shows a schematic block diagram of a transmitter to carry out the method according to the invention and FIG. 2 shows time diagrams of example signals which occur at points A, B, C and D in the block diagram of FIG. 1.
Figure 2:
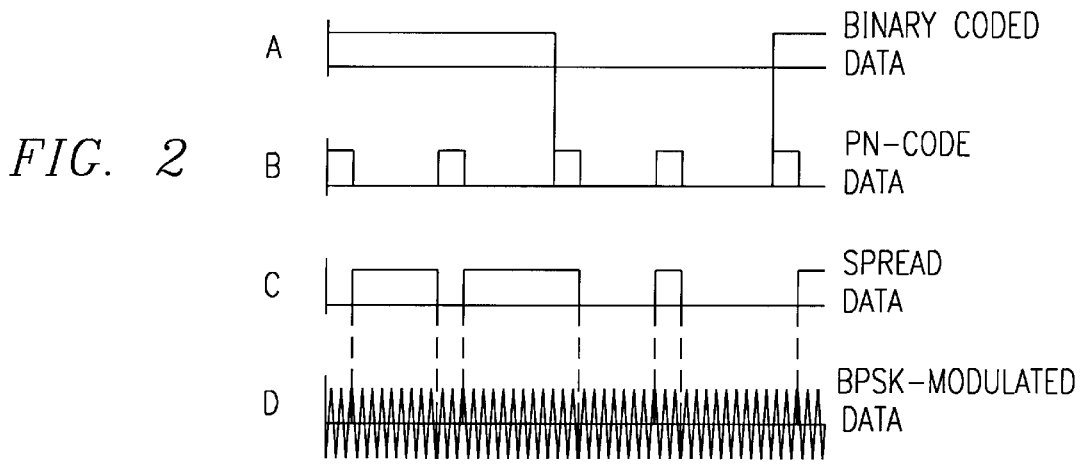

At the transmitter 10 illustrated in FIG. 1, the measurement values to be transferred are picked up by a sensor 12 and brought into a digital form by an analog/digital converter 14. In an modulo-2 circuit 16, the digitalized data are subjected to a modulo-2-addition with the output signal of a PN generator 18. The PN generator 18 produces a PN code sequence (Pseudo Noise code sequence) in the form of a rectangular signal with constant duty cycle and with a bit rate which is substantially higher than the bit rate of the data signal. The duty cycle is set at 1:4. Through this modulo-2 addition, the spectrum of the data signal is spread so that a data signal with spread spectrum is available at the output of the modulo-2 circuit 16. This spread data signal is modulated in a BPSK modulator 20 onto a carrier produced by a carrier oscillator 22. The modulation used in the described example is the binary phase shift keying modulation (Binary Phase Shift Keying), in which with each edge of the spread data, the modulated carrier undergoes a phase shift of 180°. In FIG. 2, time diagrams are illustrated of its signals appearing in points a to d of FIG. 1. The signal occurring at a represents the binary coded data emitted from the analog/digital converter 14, and at b the output signal of the PN generator occurs which, as can be seen, is a rectangular signal with the constant duty cycle 1:4. The spread data which occur at c are the result of the modulo-2 addition of the binary coded data and of the PN code sequence. The signal emitted from the BPSK modulator 20, which occurs on the line leading to the antenna 24, shows that the carrier signal emitted from the carrier oscillator 22, with each occurrence of a flank of the spread data, is phase shifted by 180°.

Figure 3:
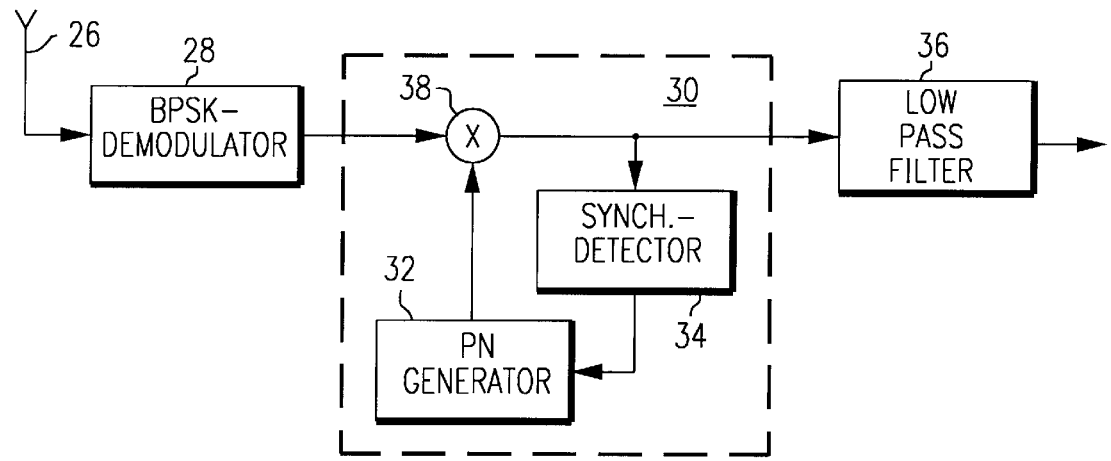
FIG. 3 shows a schematic block diagram of a receiver to carry out the method according to the invention.

In the receiver illustrated in FIG. 3, a signal transmitted from the transmitter 10 and picked up by the antenna 26 is firstly demodulated in a BPSK demodulator 28. At the output of this BPSK demodulator 28, the spread data are again available in the base band. To recover the binary coded data in the unspread state, an autocorrelation stage 30 is used in the receiver, in which stage 30 the spread data are multiplied with a PN code group produced by the PN generator 18. This PN code group is produced in a PN generator 32 in the autocorrelation stage 30; the multiplication takes place in a multiplication unit 8.

The unspreading of the data, however, only takes place when the phase relationship of the PN code group produced by the PN generator 32 coincides exactly with the phase relationship of the PN code group by which the data have been spread on the transmitter side. In other words, this means that the PN code group produced by the PN generator 32 must be synchronized with the code group contained in the spread signal. For this purpose, the autocorrelation stage 30 contains a synchronous detector 34 which, by means of the signal edges occurring in the output signal of the multiplying unit 8, can detect whether the synchronized state has been reached. Recurring signal edges which are distinguished in the output signal of the multiplying unit 8 in fact only occur in the synchronized state, as are contained in the unspread, binary coded data. As long as the synchronized state has not been reached, the multiplication in the multiplying unit 8 only brings about a further spreading of the data supplied to it from the PSK demodultor 28, whilst in the synchronized state the binary coded data are emitted from the multiplying unit 8. As long as the synchronous detector 34 does not detect any marked, recurring edges, it emits to the PN generator a signal which has the result that the phase relationship of the output signal of this generator is gradually shifted. This shifting command is repeated until the synchronous detector 34 detects the synchronous state by means of the occurrence of the binary coded data. As soon as this synchronous state has been reached, a tuned-in state occurs in the autocorrelation stage, which has the result that the PN generator 32 maintains the phase relationship of its output signal which is present at that time. In this state, the autocorrelation stage 30 emits at its output the binary coded data which can be supplied for further processing after passage through a low pass filter 36.

As a very short PN code sequence is used in the described method for the spreading of the data signals, the synchronizing can also take place very quickly in the autocorrelation stage 30 of the receiver. The data telegram can therefore be very short, so that in the transmitter only a small amount of energy is required for transmission. In addition the production of the PN code sequence only requires a simple square wave generator, which contributes to making possible a favorably-priced manufacture of the transmitter. Despite the simple means which are used for the spreading of the signal, all the advantages of the spread spectrum technique are achieved with regard to the signal-to-noise ratio and freedom from interference.

What is claimed is:

1. A method for the transfer of a digital data signal with predetermined bandwidth from a transmitter to a receiver, using a spread spectrum technique, comprising the steps of:

modulo-2 adding a digital data signal with a PN code sequence having a bit rate which is very much higher than the bit rate of the digital data signal to provide a resulting spread data signal, modulating a carrier with the resulting spread data signal, transmitting the modulated carrier, receiving and demodulating the modulated carrier to recover the digital data signal by multiplying the demodulated carrier with a PN code sequence produced in the receiver to recover the digital data signal, synchronizing the PN code in the receiver with the PN code sequence of the transmitter through autocorrelation using a periodic rectangular signal with a constant duty cycle as the PN code sequence;

wherein the duty cycle of the PN code sequence is set at about 1:4.

2. A method for the transfer of a digital data signal with predetermined bandwidth from a transmitter to a receiver, using a spread spectrum technique, comprising the steps of:

modulo-2 adding a digital data signal with a PN code sequence having a bit rate which is very much higher than the bit rate of the digital data signal to provide a resulting spread data signal, modulating a carrier with the resulting spread data signal, transmitting the modulated carrier, demodulating the modulated carrier in the receiver and multiplying the demodulated signal with a PN code sequence produced in the receiver to recover the digital data signal, wherein the PN code sequence in the receiver is synchronized with the PN code sequence of the transmitter through autocorrelation, characterized in that a periodic rectangular signal with a constant duty cycle is used as the PN code sequence;

wherein the duty cycle of the PN code sequence is set at 1:4.

3. A method for the transfer of a digital data signal with predetermined bandwidth from a transmitter to a receiver, using a spread spectrum technique, comprising the steps of:

modulo-2 adding a digital data signal with a PN code sequence having a bit rate which is very much higher than the bit rate of the digital data signal to provide a resulting spread data signal, modulating a carrier with the resulting spread data signal, transmitting the modulated carrier, receiving and demodulating the modulated carrier to recover the digital data signal by multiplying the demodulated carrier with a PN code sequence produced in the receiver to recover the digital data signal, synchronizing the PN code in the receiver with the PN code sequence of the transmitter through autocorrelation using a periodic rectangular signal with a constant duty cycle as the PN code sequence;

wherein the duty cycle of the PN code sequence is set at 1:4.

* * * * *